Sept. 8, 1942.  A. C. DURDIN, JR  2,295,391
SEWAGE TREATMENT APPARATUS
Filed Dec. 28, 1939   2 Sheets-Sheet 1
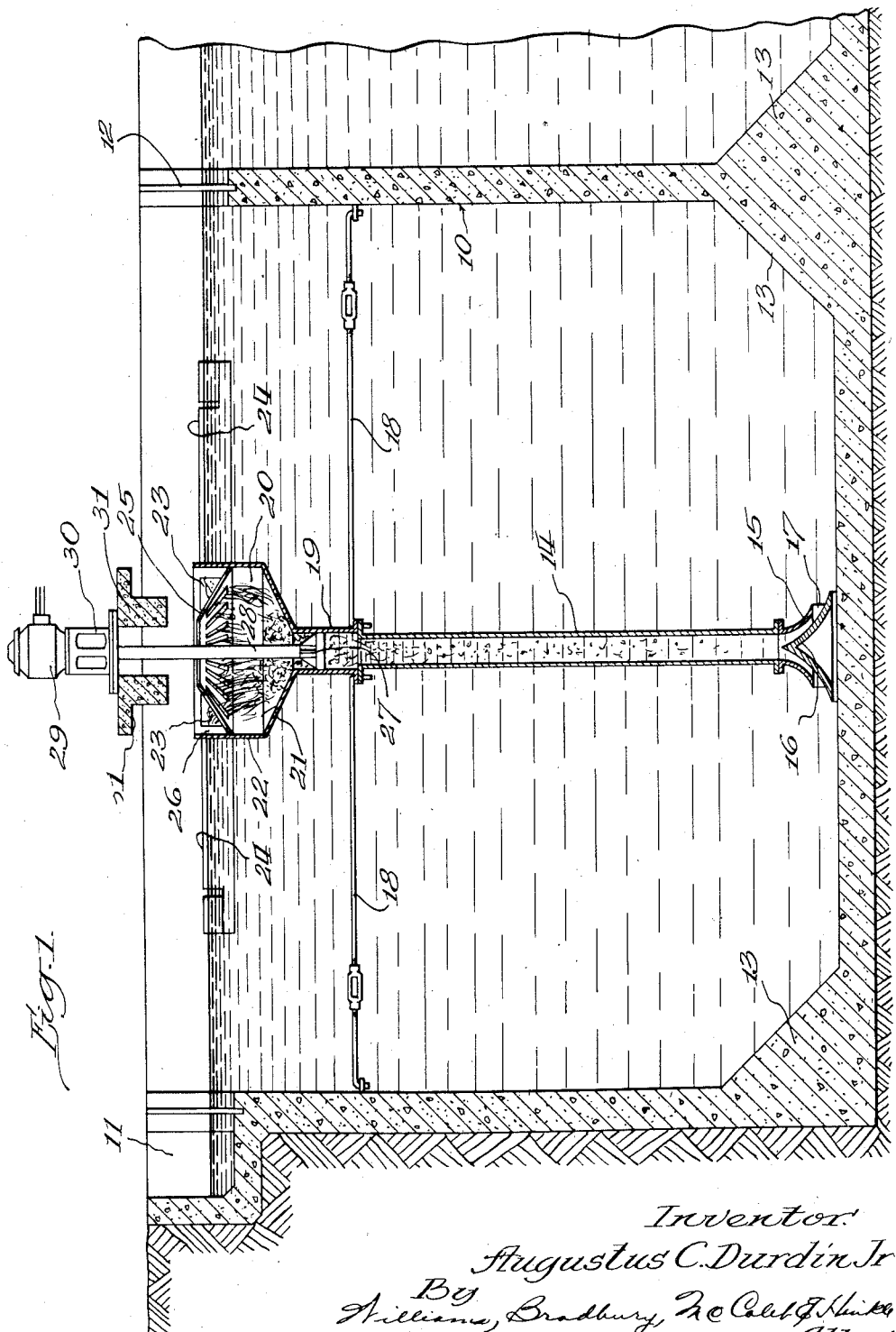

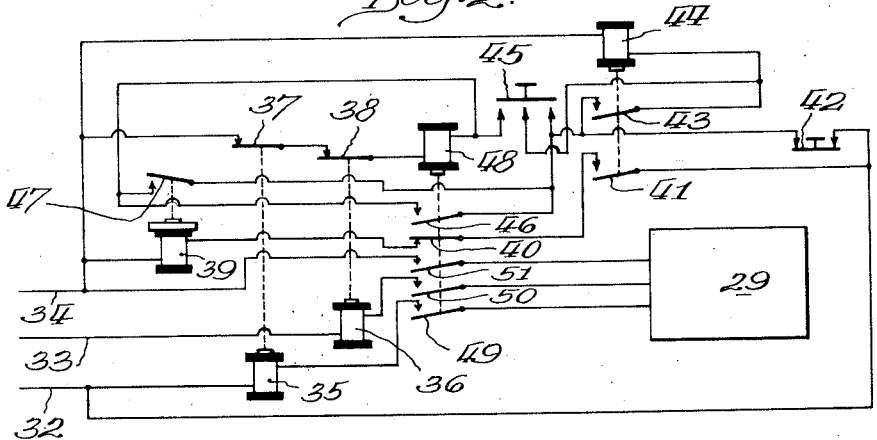
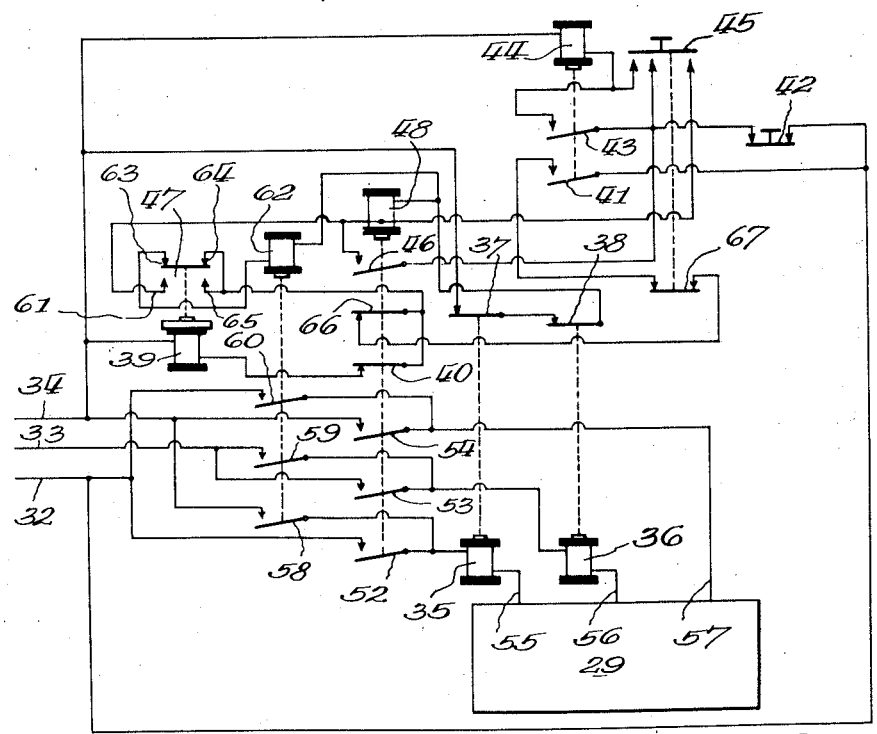

Patented Sept. 8, 1942

2,295,391

UNITED STATES PATENT OFFICE 2,295,391

SEWAGE TREATMENT APPARATUS

Augustus C. Durdin, Jr., Chicago, Ill.

Application December 28, 1939, Serial No. 311,375

8 Claims. (Cl. 210—8)

This invention relates to sewage treatment apparatus and particularly to mechanical aerators of the general type frequently employed in the purification of sewage in accordance with the activated sludge process.

The activated sludge process may briefly be described as commingling activated sludge, derived as will be hereinafter described, with incoming sewage. The mixed liquor is subjected to agitation and thorough aeration. The agitation prevents settling and the aeration maintains a supply of oxygen throughout the liquid, which insures biological changes of a purifying nature. The final result of the treatment, which may occupy, for example, around five or six hours, is a liquid which settles quite readily, yielding a purified effluent which may be turned into natural water courses without objection, and a sludge of flocculent nature which is disposed of in various ways. It is part of this sludge which is mixed with the incoming sewage as mentioned at the beginning of the description of this process.

The activated sludge process is commonly practiced in two types of installations. One type of installation comprises an elongated tank or tanks through which the liquid is passed, the aeration air being admitted through porous aerators. In another type of installation mechanical aerators are employed. The mechanical aerator is such that it causes the liquid to circulate rapidly within the tank, aeration being effected by the projection of the liquid through the air or, in some cases, by the active admixture of the air and the liquid. These mechanical aerators are normally driven by an electric motor and in actual practice it frequently happens that the motor becomes overloaded after a certain period of operation.

One of the principal objects of the invention is to provide improved mechanism whereby objectionable effects, due to such overloading, are obviated.

A further object of the invention is to provide an improved aerator which is adapted to become reversed automatically after the motor has become overloaded so as to tend to cure conditions contributing to the overload.

The invention will more readily be understood by reference to the accompanying drawings, in which:

Figure 1 is a sectional view through an aeration tank equipped with my improved aerator;

Fig. 2 is a wiring diagram of one embodiment of the invention, and

Fig. 3 is a wiring diagram of a further embodiment of my invention.

Referring to the drawings, the reference numeral 10 designates an aerator tank which may be supplied with a mixture of sewage and activated sludge through a channel 11. The tank may discharge through a channel 12 into a similar tank, not shown. It will be understood that the number of tanks employed depends upon the size of the tanks and the capacity of the plant. The tank may be of square cross-section and it may be filled in around the bottom, as indicated at 13, to prevent eddy currents and sedimentation around the bottom.

In the center of the tank is located the downflow pipe 14 which is provided at its lower end with a flared outlet member 15. A conical member 16 projects into the flared outlet member 15 and is located in spaced relation thereto to provide for the efflux of the liquid descending through the tube 14. The flared outlet member 15 rests upon projections 17 which are integral with the conical member 16.

The upper end of the downflow pipe 14 is supported by means of stays 18 which are anchored to the walls of the tank. At its upper end the downflow pipe 14 carries an impeller section 19 which, in turn, supports the mixing chamber 20 of substantially greater diameter than the impeller section 19. The mixing chamber 20 comprises a lower frustro conical portion 21 which carries an upwardly extending cylindrical wall 22 which forms the upper part of the mixing chamber.

The wall 22 is provided with a plurality of openings 23 which communicate with troughs 24 which project outwardly from the mixing chamber 20 to positions adjacent the walls of the tank 10. These troughs may be of any suitable number, for example, four, and they preferably extend to positions quite near the corners of the tank 10.

Within the mixing chamber 20 is provided a weir plate 25 which is preferably of frustro conical form, being convergent in the upward direction. It is connected to the wall 22 around its greater circumference at a height immediately below the openings 23. The troughs 24 are located so that they are supplied with liquid from the contents of the tank, that is, they are arranged so that their lower portions are below the normal liquid level of the tank. The liquid flows inwardly into the annular space 26 provided between the upper part of the wall 22 and the weir plate 25, and it flows through openings in the weir plate down into the lower part of the mixing chamber 20 during the normal operation of the aerator.

An impeller 27 is located within the impeller section 19. The impeller 27 is carried by a shaft 28 of a motor 29. The motor 29 is carried by a frame 30 upon girders 31 extending across the tank. In normal or forward operation the motor 29 operates the impeller so as to force liquid downwardly through tube 14, which causes a circulation around the tank 10. The liquid being received at points remote from the center by means of the troughs 24, short-circuiting of the liquid is prevented.

When the impeller 27 forces the liquid downwardly, liquid flows in through the slots of the weir plate 25 and splashes downwardly into the mixing chamber 20 wherein it is thoroughly admixed with air. The air is churned up by the impeller 27 and is finally distributed throughout the liquid with the result that the air in the form of small bubbles is, to a great extent, forced down through the pipe 14 and rises up through the liquid in the tank 10 around the pipe 14. This intimate treatment of the liquid with the air maintains a high rate of supply of oxygen to the liquid so that the biological changes of aerobic type may continue without interruption during the course of the treatment.

Referring to Fig. 2, the motor 29, which may suitably be a three-phase alternating current motor, is supplied with two power lines 32 and 33 and a common power line 34. The power lines 32 and 33 contain the windings of relays 35 and 36, respectively, which are adapted, when energized sufficiently, to open one or other of the associated overload switches 37 and 38, respectively.

The power line 34 is connected to the power line 32 through the winding 39 of a timing relay, a normally closed switch 40, and a normally open switch 41. The power line 34 is also connected to the power line 32 by a parallel circuit which includes a normally closed stop switch 42, a normally open switch 43, and a winding 44 of a relay which, when energized, is adapted to close switches 41 and 43.

The common sides of the winding 44 and switch 43 are connected to the three-point make switch 45. One side of the switch 45 is connected to the stop switch 42, to the other side of the switch 43, to one side of a normally open switch 46, and to one side of the normally open switch 47. The three switches 45, 46 and 47 are arranged in parallel, their common side being connected to a winding 48 of a relay which is adapted, when energized, to close the switch 46 and open the switch 40. The winding 48 is in series with the switches 37 and 38.

Each of the power lines 32, 33 and 34 includes a switch 49, 50 and 51, respectively. These switches are normally open and are adapted to be closed by the winding 48 when energized. The switches being in the relation shown in Fig. 2, operation of the motor is started by closing the switch 45. This completes a circuit from power line 34 through switches 37, 38, winding 48, switch 45, and switch 42 to power line 32. This circuit energizes the winding 48, closes the switch 46, opens the switch 40 and closes the three switches 49, 50 and 51. The closing of the latter switches puts the motor in operation. The closing of the three-contact switch 45 also completes a circuit from power line 34 through winding 44, switch 45 and switch 42 to power line 32.

The energization of the winding 44 closes the switches 43 and 41 and holds these switches closed during the continued operation of the motor. This results from the fact that the energized winding 44 maintains the switch 43 closed and that the circuit through this winding is completed through the closed switch 43 and the normally closed stop switch 42. When the stop switch 42 is manually opened, the winding 44 is deenergized and switch 43 opens so that the closing of the switch 42 does not result in the energization of the winding 44. This energization can only occur by the closing of the switch 45, the switch 42 being closed. The winding 48 remains energized, since a circuit is completed through switch 37, switch 38, winding 48, closed switch 46 and switch 42. Opening the stop switch 42 results in the deenergization of the winding 48 and the opening of the switches 49, 50 and 51.

In the event that the motor is overloaded, one or other of the switches 37, 38 is opened. This also results in the deenergization of the winding 48 and the stoppage of the motor. As a result of the deenergization of the winding 48, the switch 46 opens, the switch 40 closes, and the switches 49, 50 and 51 open. The opening of one or other of the switches 49 and 50 results in the closing of the switch 37 or 38 associated with the winding 35 or 36, respectively. A circuit is then completed through winding 39, closed switch 40 and closed switch 41. As a result of the energization of the winding 39, the switch 47 is closed after a delay provided in known manner, for example, by a slug on the winding 39. Consequently, the motor stops and after a short delay resumes operation. The resumption results from the closing of the switch 47 which re-energizes the winding 48 which, in turn, opens the switch 40 and closes the switches 46, 49, 50 and 51 so that the motor is again put into operation.

In the embodiment of the invention shown in Fig. 3, means are provided whereby the motor is not only arrested on overload, but is subjected to a period of reverse operation. In this embodiment of the invention power lines 32, 33 and 34 are connected respectively to three poles 55, 56 and 57, respectively, of the motor when the switches 52, 53 and 54 are closed. When, however, the switches 58, 59 and 60 are closed, the power lines 32, 33 and 34 are connected to the poles 57, 56 and 55, respectively.

The overload windings 35 and 36 are associated with switches 37 and 38, as in the previously described embodiment. The power line 32 is connected to one side of the switch 41 and to one side of the switch 42, as in the previously described embodiment. The power line 34 is connected to one side of the winding 39 of the time delay relay, as in the previously described embodiment. The power line 34 is also connected to two switches 37 and 38 which are arranged in series. The power line 34 is also connected to one side of the winding 44 which cooperates with the two switches 43 and 41, as previously described.

The other side of the winding 44 is connected to one side of the switch 43 and to the three-point make switch 45 which is the start switch. The other side of the switch 43 is connected to one side of the switch 42, to one point of the switch 45 and to one side of the switch 46. The third point of the switch 45 is connected to the winding 48, to the other side of the switch 46 and to a contact 61 of the switch 47.

The other side of the winding 48 is connected to one side of the switch 38 and to one side of the winding 62. The other side of the winding 62 is connected to a contact 63 associated with the switch 47. The other side of the winding 39 is connected to one side of a switch 40. The other side of the switch 40 is connected to contacts 64 and 65 associated with the switch 47 and to one side of the normally closed switch 66. The other side of the switch 66 is connected through the normally closed switch 67 to the other side of the switch 41.

The switch 67 which is normally closed, is mechanically associated with the starting switch 45 so that it is opened when the starting switch 45 is closed. The normally open switches 46, 52, 53 and 54 and the normally closed switches 40 and 66 are controlled by the winding 48. The normally open switches 58, 59 and 60 are controlled by the winding 62. The switch 47 normally connects the contacts 63 and 64. When the winding 39 is energized, this connection is opened and the contact 61 is connected to the contact 65. It will readily be understood that, as in the previously described embodiment, the winding 39 is arranged to cooperate with the switch 47 so as to provide a delay relay.

The operation is as follows: To start the machine the switch 45 is momentarily closed. This results in the energization of the winding 44 and the closing of the switches 41 and 43. These switches remain closed until the switch 42 is manually opened. The closing of the switch 45 energizes the winding 48. The switch 46 is thereupon closed, the switches 66 and 40 are opened and the switches 52, 53 and 54 are closed, putting the motor into operation. The winding 48 remains energized, since it holds the switch 46 closed. Owing to the open condition of the switches 40 and 66 and the disconnection between the contacts 61 and 65, the windings 62 and 39 are not energized.

It will be noted that when the starting switch 45 is closed, the switch 67 is opened and consequently the windings 39 and 62 cannot be energized when the starting switch is closed. When the switch 67 is closed, the switch 66 is open so that the switches 58, 59 and 60 remain open, whereas the switches 52, 53 and 54 are closed to provide drive in the forward or normal direction.

The operation continues until one or other of the windings 35 or 36 draws excessive current, whereupon one or other of the switches 37, 38 opens. When this occurs the winding 48 is deenergized, the switches 46, 52, 53 and 54 open and the switches 40 and 66 close. As a result of the closing of the switch 66 a circuit is completed through switches 37 and 38 (which immediately close on the cessation of the overload), the winding 62, switch 47 and switches 66, 67 and 41. Consequently, the winding 62 is energized and the switches 58, 59 and 60 are closed. The motor is consequently driven in the opposite direction.

At the end of a short period, the time delay relay switch 47 moves out of engagement with the contacts 63 and 64 into engagement with the contacts 61, 65. When this delayed movement occurs, the winding 62 is deenergized and the switches 58, 59 and 60 are opened. Then a circuit is completed through switches 37, 38, winding 48, switch 47, switches 66, 67 and 41, so that the winding 48 is energized, the switches 46, 52, 53 and 54 are closed, and switches 66 and 40 are opened. Consequently, the motor operates in the forward direction until overload occurs.

It will thus be understood that I have provided means for operating the impeller 27 in two characteristically different ways. According to the first method of operation, the impeller 27 is driven in the forward direction so as to cause the liquid to circulate down the pipe 14. The incoming liquid enters the troughs 24 and spills over through the orifice plate 25 into the chamber 20, being thoroughly mixed with the air in so falling.

Furthermore, the impeller 27 thoroughly churns the liquid and air together and forces the mixture downwardly through the pipe 14.

When overload occurs, the motor 29 may be arrested when equipped according to the wiring diagram of Fig. 2. After a short interval of time the motor starts again. During that short interval of time the liquid fills into the chamber 20 and the eddy currents or other phenomena which overloaded the drive are given time to terminate. The motor 29 starts under low load owing to the high liquid level in the chamber 20, and the rapid longitudinal movements of the liquid within the pipe 14 during starting and stopping contribute greatly to the abolishing of the overloading condition.

When the sewage treatment apparatus is connected according to the wiring diagram of Fig. 3, then when overload occurs the motor 29 is put into reverse. The reversing of the motor has the effect of immediately destroying the conditions which cause the overload. Furthermore, this reversal pumps liquid through the orifice plate 25 in reverse direction and also causes the liquid to flow outwardly through the troughs 24. Consequently, any floating debris which tends to congregate adjacent the orifice plate 25 or in the troughs 24 is removed from these locations. At the same time rags and other debris which may have become entangled with the blades of the impeller 27 are removed therefrom.

Although the invention has been disclosed in connection with the specific details of preferred embodiments thereof, it must be understood that such details are not intended to be limitative of the invention except in so far as set forth in the accompanying claims.

Having thus described my invention, which I claim as new and desire to secure by Letters Patent of the United States is:

1. Apparatus for treating sewage comprising a tank, propelling means in said tank for circulating and aerating sewage liquid therein, power means for driving said propelling means, means responsive to overload of the propelling means for terminating the drive thereof, and automatic means for causing resumption of said drive after a definite period of stoppage.

2. Apparatus for treating sewage comprising a tank, propelling means in said tank for circulating and aerating sewage liquid therein, power means for driving said propelling means, and means responsive to overload of the propelling means for reversing the propeller means.

3. Apparatus for treating sewage comprising a tank, propelling means in said tank for circulating and aerating sewage liquid therein, an electric motor for driving said propelling means, means responsive to overload current for stopping the motor, and automatic means for causing resumption of the operation of said motor.

4. Apparatus for treating sewage comprising a tank, propelling means in said tank for circulating and aerating sewage liquid therein, an electric motor for driving said propelling means, and means responsive to overload current for reversing the motor and said propelling means.

5. Apparatus for treating sewage comprising a tank, a vertical pipe in said tank, propelling means adapted to cause liquid in the tank to circulate through said pipe, an electric motor driving said propelling means, means controlled by overload of said motor for stopping said motor and automatic means for causing resumption of the operation of said motor.

6. Apparatus for treating sewage comprising a tank, a vertical pipe in said tank, propelling means adapted to cause liquid in the tank to circulate through said pipe, an electric motor driving said propelling means, and means controlled by overload of said motor for reversing said motor and said propelling means.

7. Apparatus for treating sewage comprising a tank, a vertical pipe in said tank, propelling means adapted to cause liquid in the tank to circulate through said pipe, an electric motor driving said propelling means, means controlled by overload of said motor for reversing said motor and said propelling means, and automatic time delay means for causing said motor and said propelling means to resume operation in their normal directions.

8. Apparatus for treating sewage comprising a tank, a vertical pipe in said tank, propelling means adapted to cause liquid in the tank to circulate through said pipe, an electric motor driving said propelling means, means controlled by overload of said motor for stopping said motor, and time delay means for causing said motor to resume operation.

AUGUSTUS C. DURDIN, Jr.